(12) United States Patent
Elfner et al.

(10) Patent No.: US 7,784,022 B2
(45) Date of Patent: Aug. 24, 2010

(54) MAPPING A NEW USER INTERFACE ONTO AN EXISTING INTEGRATED INTERFACE

(75) Inventors: Stefan Elfner, Heidelberg (DE); Ruediger Kretschmer, Bruchsal (DE); Martin Zurmuehl, Mühlhausen (DE)

(73) Assignee: SAP AG, Walldorf (DE)

( * ) Notice: Subject to any disclaimer, the term of this patent is extended or adjusted under 35 U.S.C. 154(b) by 1156 days.

(21) Appl. No.: 11/411,463

(22) Filed: Apr. 25, 2006

(65) Prior Publication Data

US 2007/0250304 A1  Oct. 25, 2007

(51) Int. Cl.
*G06F 9/44* (2006.01)

(52) U.S. Cl. .................. 717/105; 717/101; 717/102; 717/109; 717/113; 715/762; 715/763; 715/769

(58) Field of Classification Search .............. 717/100, 717/103, 107, 101, 102, 105, 109, 113; 715/762, 715/763, 769; 707/E17.124; 719/318; 703/27
See application file for complete search history.

(56) References Cited

U.S. PATENT DOCUMENTS

| | | | | |
|---|---|---|---|---|
| 5,850,548 | A | * | 12/1998 | Williams .................... 717/107 |
| 5,870,727 | A | * | 2/1999 | St. Jacques et al. ........... 706/11 |
| 6,158,044 | A | * | 12/2000 | Tibbetts ...................... 717/100 |
| 6,272,675 | B1 | | 8/2001 | Schrab et al. ............... 717/100 |
| 6,298,478 | B1 | * | 10/2001 | Nally et al. ................. 717/170 |
| 6,550,057 | B1 | * | 4/2003 | Bowman-Amuah ......... 717/126 |
| 6,697,880 | B1 | * | 2/2004 | Dougherty .................. 719/320 |
| 6,901,554 | B1 | | 5/2005 | Bahrs et al. |
| 6,987,838 | B2 | | 1/2006 | Winterbottom |
| 7,027,408 | B2 | | 4/2006 | Nabkel et al. |
| 7,028,221 | B2 | | 4/2006 | Holland et al. |
| 7,031,320 | B2 | | 4/2006 | Choe |
| 7,036,043 | B2 | | 4/2006 | Martin et al. |
| 7,036,128 | B1 | | 4/2006 | Julia et al. |
| 7,051,071 | B2 | * | 5/2006 | Stewart et al. .............. 709/204 |
| 7,694,272 | B2 | * | 4/2010 | Bronicki et al. ............. 717/109 |
| 2003/0121027 | A1 | * | 6/2003 | Hines ......................... 717/135 |
| 2003/0145305 | A1 | * | 7/2003 | Ruggier ...................... 717/100 |
| 2004/0107414 | A1 | * | 6/2004 | Bronicki et al. ............. 717/105 |
| 2004/0128648 | A1 | * | 7/2004 | Rappoport et al. .......... 717/105 |
| 2005/0050551 | A1 | * | 3/2005 | Sparago et al. ............. 719/320 |

(Continued)

FOREIGN PATENT DOCUMENTS

WO         03032139 A      4/2003

(Continued)

OTHER PUBLICATIONS

Title: A computational mapping engine portal for accessing geolibraries, author: O'Hara C; King R, source IEEE, publication date: Jul. 2003.*

(Continued)

*Primary Examiner*—Chameli C Das
(74) *Attorney, Agent, or Firm*—Kenyon & Kenyon LLP

(57) ABSTRACT

A method, system, computer readable medium containing instructions to execute a method for an intermediary, such as a controller, to interact between the interface of an older application and a newly programmed User Interface in order to take advantage of existing transactional logic while still allowing a user to interface with a new User Interface.

56 Claims, 9 Drawing Sheets

U.S. PATENT DOCUMENTS

| | | |
|---|---|---|
| 2005/0144174 A1 | 6/2005 | Pesenson et al. |
| 2005/0203764 A1* | 9/2005 | Sundararajan et al. ......... 705/1 |
| 2006/0136833 A1* | 6/2006 | Dettinger et al. ............ 715/769 |
| 2007/0168907 A1* | 7/2007 | Iborra et al. ................ 717/100 |
| 2007/0168974 A1* | 7/2007 | Mockford ................... 717/124 |
| 2008/0235610 A1* | 9/2008 | Dettinger et al. ............ 715/769 |

FOREIGN PATENT DOCUMENTS

| | | |
|---|---|---|
| WO | 2004019160 A | 3/2004 |

OTHER PUBLICATIONS

Title: Multi-user interface and interactions on direct-touch horizontal surfaces: collaborative tabletop research at MERL, author: Chia Shen, source IEEE, publication date: Jan. 2006.*

XP-002265497, Struts User's Guide, Jul. 25, 2001, Retrieved from the Internet: URL:http://www.aoindustries.com/docs/jakarta-struts-1.0-b1/users_guide.html>.

* cited by examiner

MAPPING A NEW USER INTERFACE ONTO AN EXISTING INTEGRATED INTERFACE

BACKGROUND

Software programs frequently go through many version cycles. Often, new versions provide maintenance upgrades, such as security enhancements of fixing bugs. New versions can also provide substantive changes such as altering a user interface (UI) or altering the backend processing or functionality, even when it is processing that is not observed by the user. For example, current Enterprise Resource Planning (ERP) systems help to automate business practices by using sophisticated business logic on the back end and dynamic user interfaces on the front end. These ERP systems are highly adaptable to specific business practices and change frequently to reflect changes in the business environment, or the specific business type that the software is being tailored for. However, in some cases, older "legacy" software contains much of the needed functionality base of a software system and all that needs to be "upgraded" is additive functionality and a new UI.

Legacy software applications may have front-end UIs which may be inseparable with backend transactional logic, such as business logic. Due to the inseparability, the newer software may not be able to utilize the same or similar transactional logic of the older applications. Companies would thus have to rewrite existing transactional logic for the sole purpose of interacting with the newer interfaces. This create a significant burden on a company in terms of programming man-hours as well as money.

DETAILED DESCRIPTION

In order to promote not only code reusability, but also entire transactional logic reusability, data must be able to be transmitted to and accessed from the transactional logic of legacy software programs. However, if a UI layer is integrated with a transactional logic layer, there is not a method in the art to separate the code in order to access the transactional logic. An advantage of an embodiment of the invention is that it uses an intermediary to serve as a surrogate user by mapping inputs by the user from a new first interface to an older second interface. The intermediary then takes the data or messages that are returned from the older second interface back to the new interface logic to create a new third interface display for the user to manipulate. In this way, newer UIs can be developed while being able to access older transactional logic.

An embodiment of the invention may utilize a new UI if it contained an arrangement receiving input data from a first user interface. The arrangement may contain any type of computing device or processor on a server, PDA, laptop, etc. An embodiment of the invention may further contain an arrangement transmitting a first set of data to an intermediary, the arrangement comprising a network device, router, ethernet cable, ethernet card, wireless card, etc. An embodiment may further comprise an arrangement mapping the first set of data to a second user interface, the arrangement comprising a processor on a computing device, such as a server, laptop, PDA, desktop, etc. An embodiment may further contain an arrangement transmitting a second set of data to the second user interface, the arrangement comprising the same or a different transmitting device such as a network device, router, ethernet cable, ethernet card, wireless card, etc. An embodiment may further comprise an arrangement transmitting a third set of data from the second interface to the intermediary, the arrangement comprising the same or a different transmitting device such as a network device, router, ethernet cable, ethernet card, wireless card, etc. The embodiment may also contain an arrangement providing a third user interface, the arrangement comprising a laptop monitor, TV monitor, LCD display on a computing device, etc.

Figure 1:
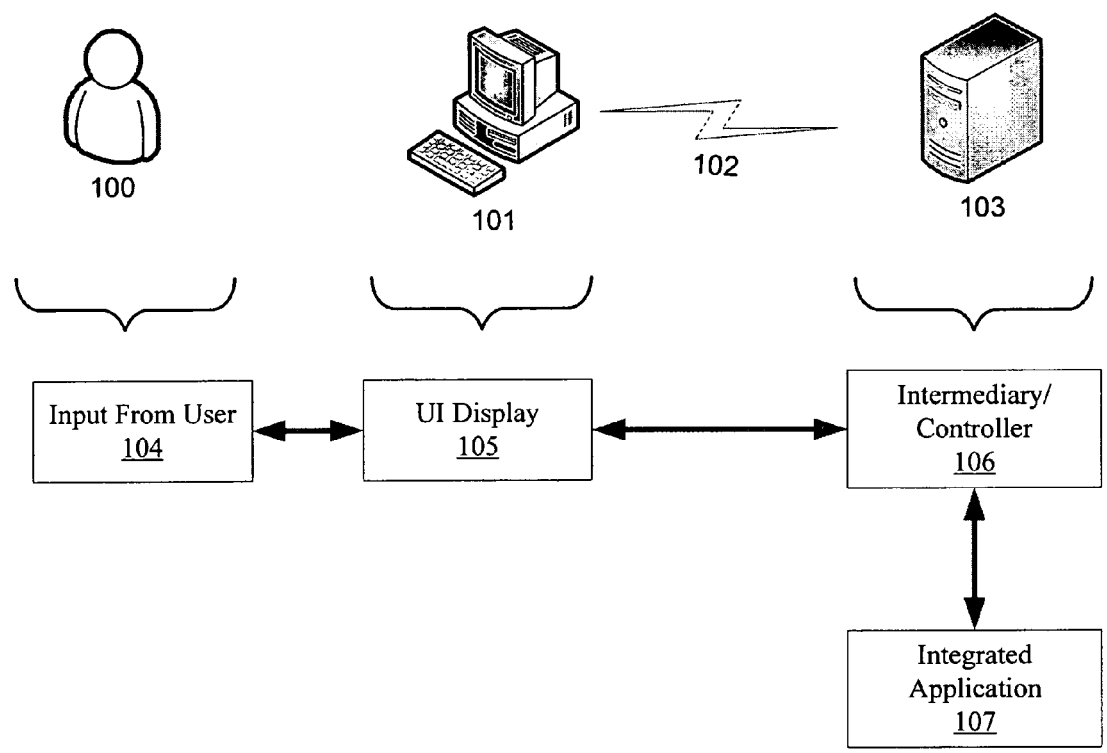
FIG. 1 depicts a possible configuration of a system capable of using an embodiment of the invention.

FIG. 1 depicts a possible configuration of a system capable of using an embodiment of the invention. A user 100 inputs data 104 into a user interface display 105, which could be a graphical display, text display, etc., on a computing device 101. The computing device 101 takes the input and the embodiment either processes the information, or in cases where the interface has no transactional logic integrated, transmits the information to a server 103 over a communication medium 102. Within the server 103, an intermediary, depending on the design paradigm it can be a controller 106, accepts the transmitted data and can use an older "integrated application" 107, meaning the application has interface logic and transactional logic that is inseparable, to process this data. The integrated application 107 may then communicate information back to the intermediary 106 which can in turn update the display 105. The computing device 101 can be any hardware that has processing or computational capability, such as a laptop, handheld device, etc. The communication medium 102 can be either intranet or internet and over a wireless or wired communication (e.g. ethernet cable). The server 103 can hold database information, and one can distribute the functional modules of an embodiment across one or more server computers 103 as appropriate.

Figure 2:
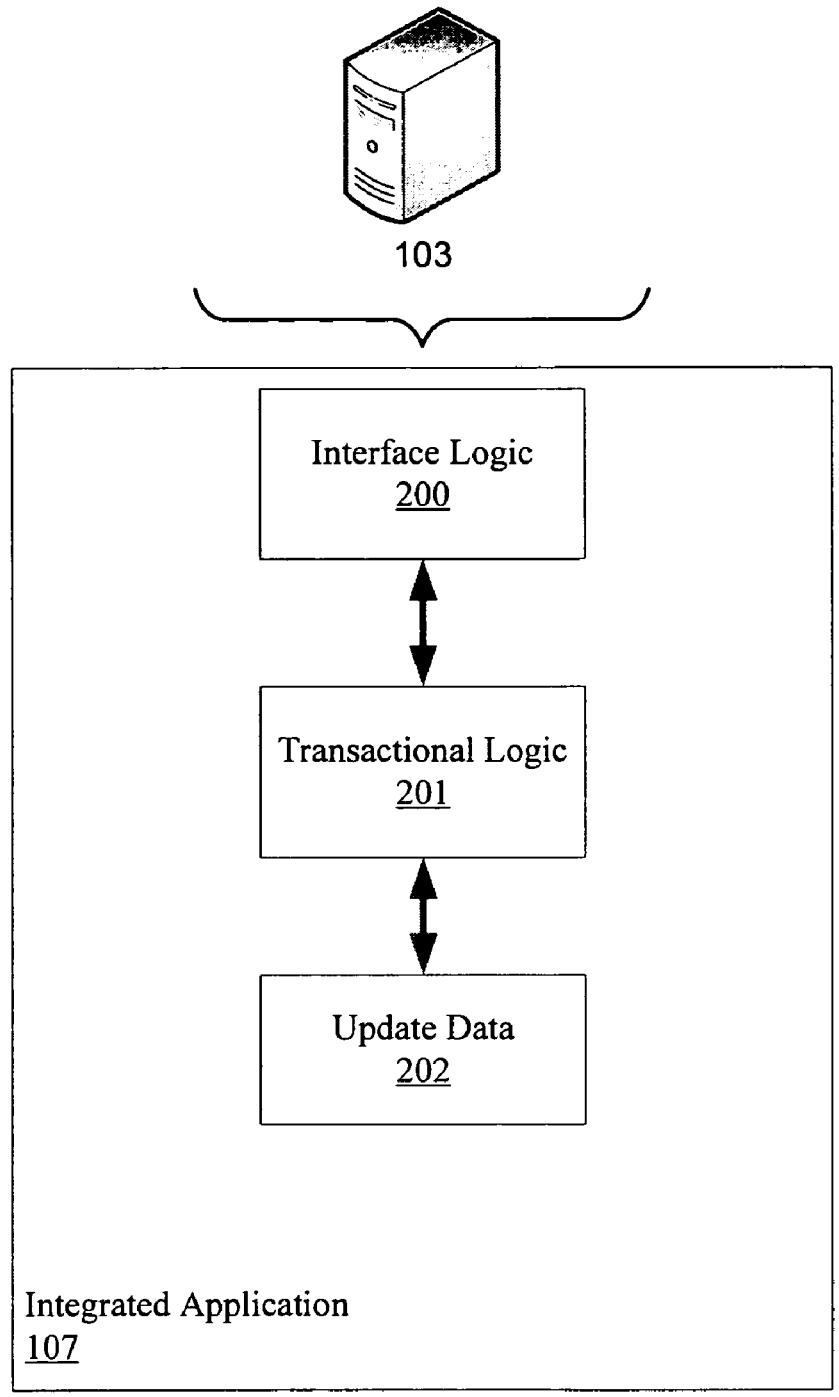
FIG. 2 depicts the structure of an example integrated application that is located on a server.

FIG. 2 depicts the structure of an example integrated application 107 that is located on a server 103. The integrated application may be the entire application itself, or could represent one of the components or modules of a larger integrated application that is located on or communicate between one or more servers. Software applications can be divided into components based on their functionality. The modularity of the components allows each unit to be characterized by its transactional or functional logic. Transactional or functional logic is meant to represent the logic used to process data, wherein the logic can be comprised of business logic, such as programs relating to financials, sales, human resources, operations, marketing, strategic management, supply chain management, etc.

In FIG. 2, the interface logic 200 receives data and transmits this information to the transactional logic 201, which can directly return that information to the interface logic 200 to display to a user, or to update the information 202 on a server storage or a database.

Figure 3:
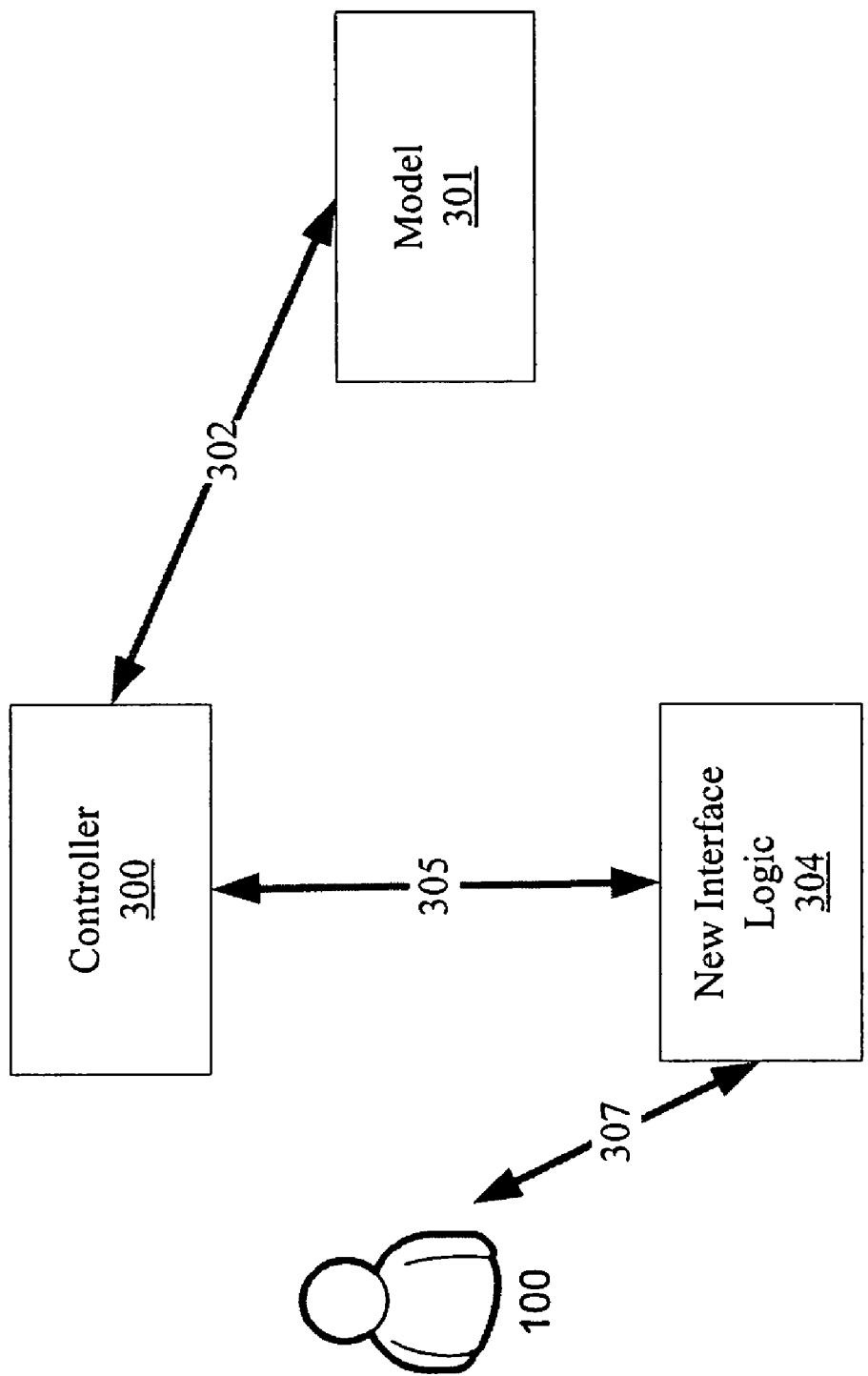
FIG. 3 depicts one embodiment of a software architecture, in particular, the architecture of a program with a new UI utilizing a modified interaction between a model-view-controller software design paradigm.

FIG. 3 depicts one embodiment of a software architecture, in particular, the architecture of a program with a new UI utilizing a modified interaction between a model-view-controller software design paradigm. The model 301, view (which in an embodiment of the invention uses a new interface logic 304), and the controller 300 (which in an embodiment of the invention acts as an intermediary) interact to change the state of data, manipulate the UI of a view, etc., in a software application. A software application displays 307 a view using a new interface logic 304 to a user 100. The user 100 interacts 307 with the New Interface Logic 304. The New Interface Logic 304 transmits 305 through the controller 300 which transmits 302 to the model. The controller interprets the commands of the user and translates and transmits 302 interactions, actions, or events from the user 100 to the model 301. The model 301 then takes this data and processes it with transactional logic, manipulating the state of the data given or the data that is already in storage. The model 301 can also send messages, as well as provide data and attributes of the data back to the controller 302. Any data or information transmitted back through to the controller 302 may be processed through the controller and transmitted 305 to the new interface logic 304.

One advantage of having a separate UI paradigm is that UIs typically undergo significant changes, either to adapt to changes in UI practice or to accommodate different classes of users. For example, web or client UI may be adaptable depending on the role of the user, such as a manager versus an employee, or a sales person versus an administrator. The UI carries only the necessary screen logic to display information to a specific user. Otherwise, it typically contains no transactional logic of its own. This allows the UI that is presented to the user to be adaptable and flexible. Moreover, because these interfaces are separate, they can be implemented on the same hardware or on different hardware, such as on a web interface or a sub-GUI rich client that is installed on another computer, viewed over the Internet or an intranet. These interfaces can also be adapted to work with different kinds of modules that contain various types of transactional logic.

The present invention is not limited to only modular software applications. Integrated applications would still be able to take advantage of an embodiment of the present invention. For example, if an integrated application was completely rewritten but required access to transactional logic on an older version, an intermediary could still be created within the transactional logic of the newer integrated application to act as the surrogate user to interact with the UI of an older version of an integrated application.

Figure 4:
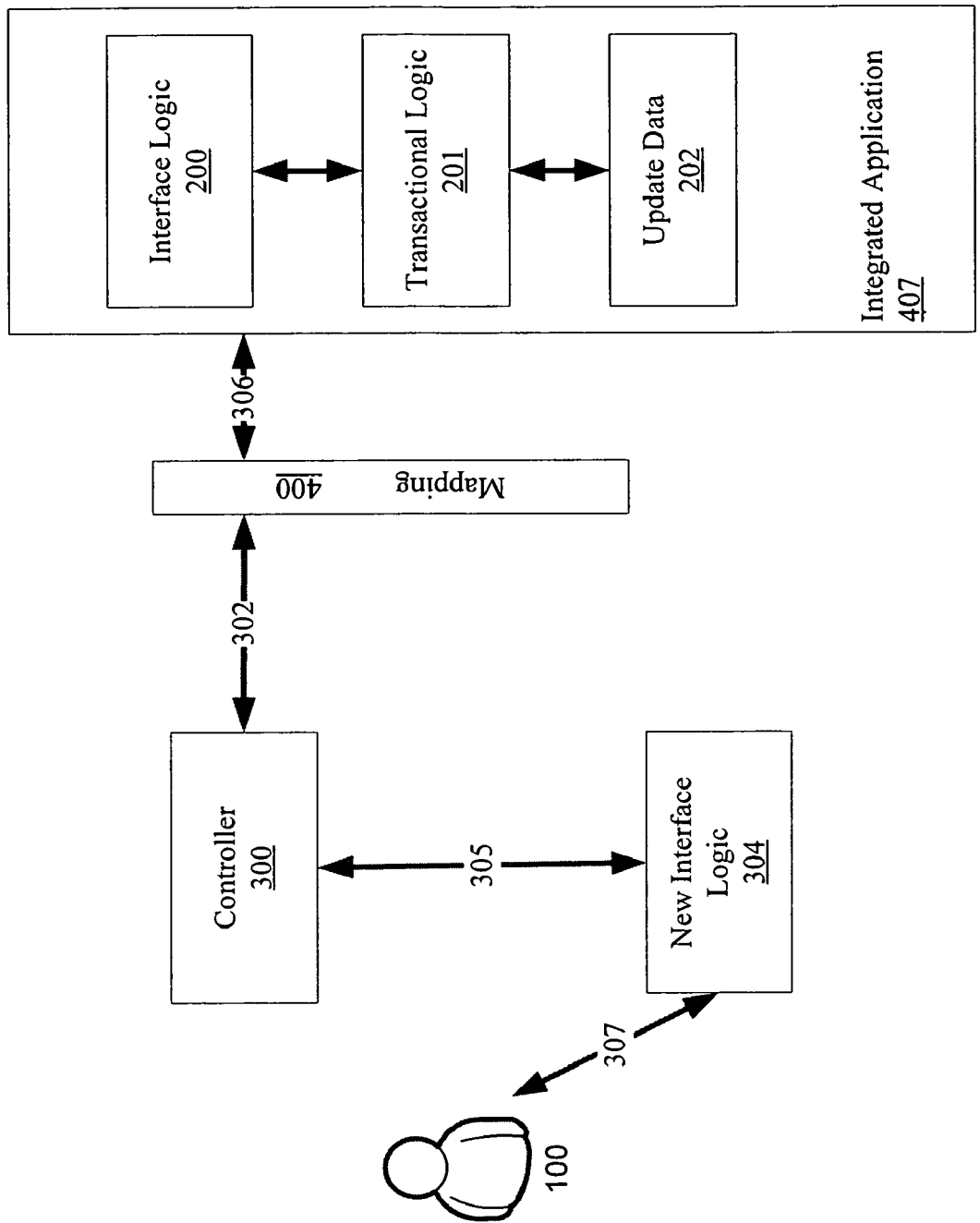
FIG. 4 depicts an example of a model-view-controller paradigm expanded to explain the intermediary process.

FIG. 4 depicts an example of a model-view-controller paradigm expanded to explain the intermediary process. The model 301 in FIG. 3 was acting as the transactional logic and interpreter of inputs from the controller. In FIG. 4, the transactional logic 201 of a module of an integrated application 407 is needed to perform a function on data input by the user 100. One method of interacting between an intermediary (in this case the controller 300) and the model's transactional logic (in this case the transactional logic 201 of the integrated application 407 module) is to have a mapping 400 that the controller 302 uses to map data to correspond to inputs accepted by the interface logic 200. The controller 300 may store some of the data and further transmit 302 the entire set of data or a different set of data, comprising a partial set of data and other information in the controller 300, through the mapping 400. Data and "set of data" can be used interchangeably depending on the type of data transmitted, the organization of the data objects, or transmission method. Data sent 302 through the controller 300, either to the integrated application 407 or on the way back after processing, may be stored. For example, if updated information coming back from the integrated application is relayed 302 through the controller 300 and used with newly input information 104, the data could be combined by the controller 300 and transmitted 305 to update the new interface logic 304.

When the interface logic 200 receives the mapped data 306, the transactional logic 201 processes the data and updates data if necessary 202. Any messages, data, or attributes of data can be transmitted 306 through the mapping 400 back 302 to the controller 300. The controller 300 can store the sets of data that are mapped back. The controller can use the mapped data to update a new interface logic 304. The new interface logic 304 can take any available data, attributes of the data, and mapping information, if available, to provide 305 a new display to the user 100.

Figure 5:
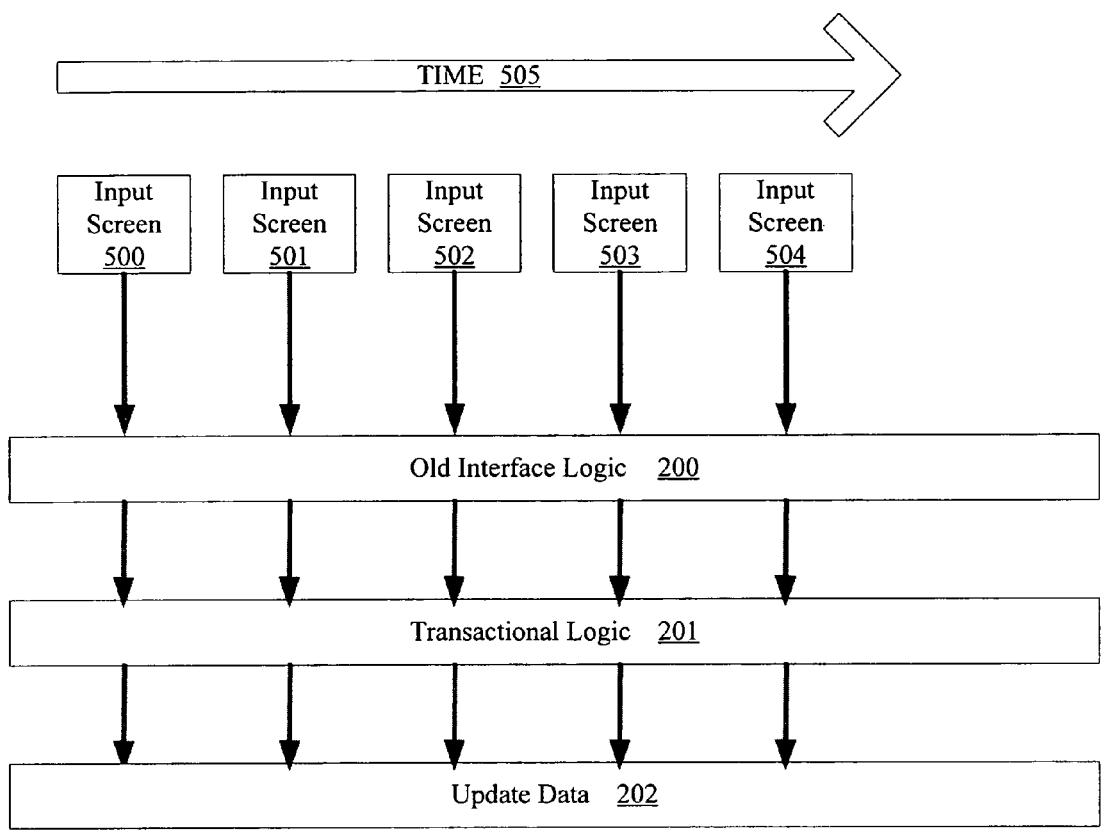
FIG. 5 depicts an example interaction that a user would have with an integrated application that could be used by an embodiment of the invention prior to the application of an intermediary module.

FIG. 5 depicts an example interaction that a user would have with an integrated application that could be used by an embodiment of the invention prior to the application of an intermediary module. The user is provided with a first input screen 500. The user inputs data which is passed to the old interface logic 200, which passes the data to the transactional logic 201 to be processed. The transactional logic updates data 202 or processes the data completely in the "dark," meaning that the user does not see the results of the processing, nor is the display necessarily updated at the end of the processing. Therefore, as time progresses 505, the user receives new input screens 501, 502, 503, 504, etc. with which to input more data, but without seeing the data dynamically updated on the interface. Meanwhile all the processing of the data is going on in the background 201 and 202.

Figure 6:
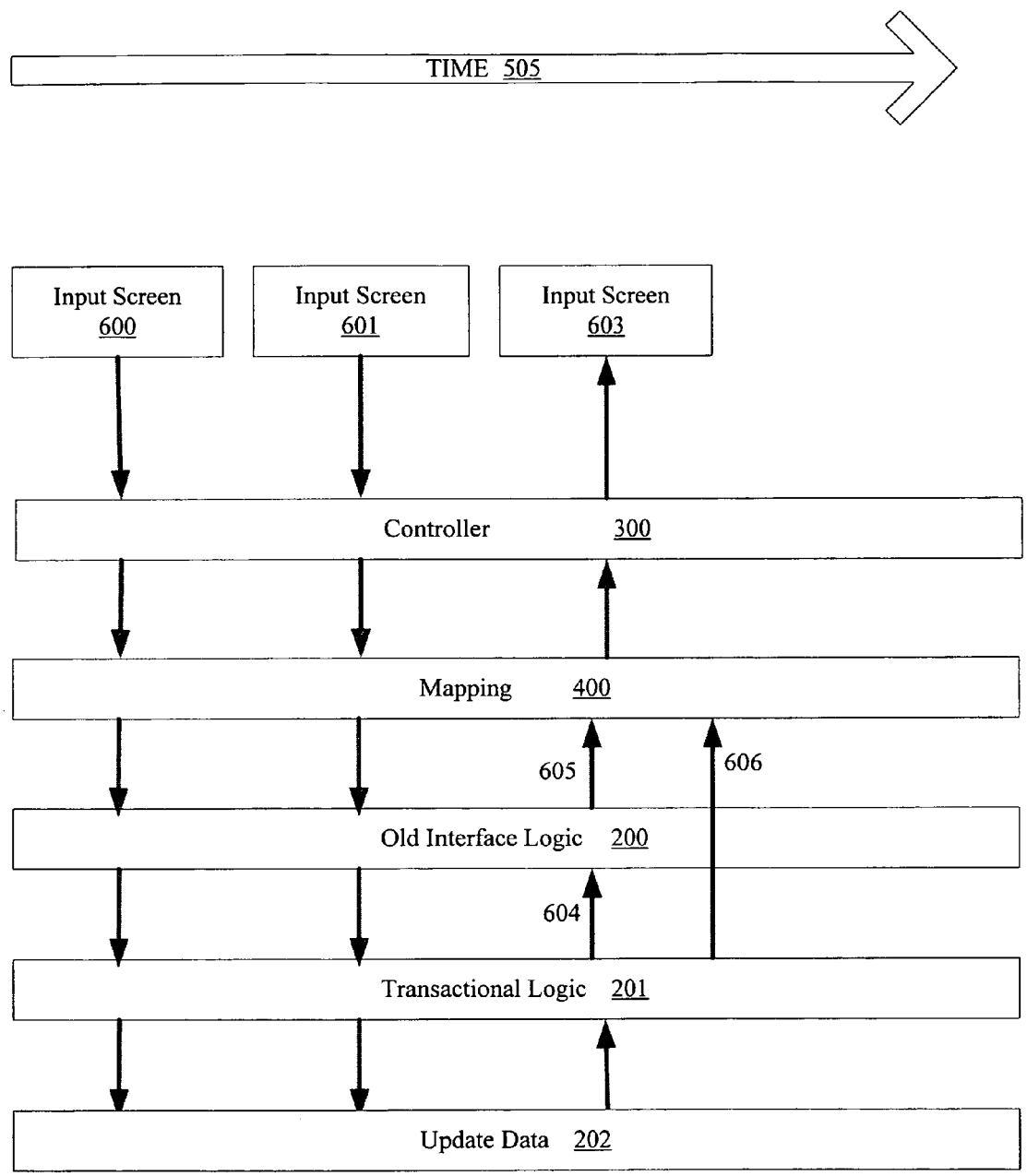
FIG. 6 depicts an example interaction that a user would have with a new UI which accesses the transactional logic of an older integrated application by communicating through the mappings of an intermediary module.

FIG. 6 depicts an example interaction that a user would have with a new UI which accesses the transactional logic of an older integrated application by communicating through the mappings of an intermediary module. Again, over time 505, the user is inputting data into input screens 600 and 601. However, these input screens are now using a new interface logic, that may not be integrated with transactional logic as in FIG. 5. Thus, data is now being sent through an intermediary, in this case a controller 300, which sends data through a mapping 400 to the old interface logic 200 and processed by the transactional logic 201 and potentially updates data 202. Messages, data updates, and attributes of data are relayed back through to the mapping either directly 606 or indirectly 604 to 605. The mapped data is then sent to the controller 300 which can provide interface logic with a new input screen to the user 603. The user may view data that is dynamically updated because while the processing occurs in the background, it is not running in the "dark."

Figure 7:
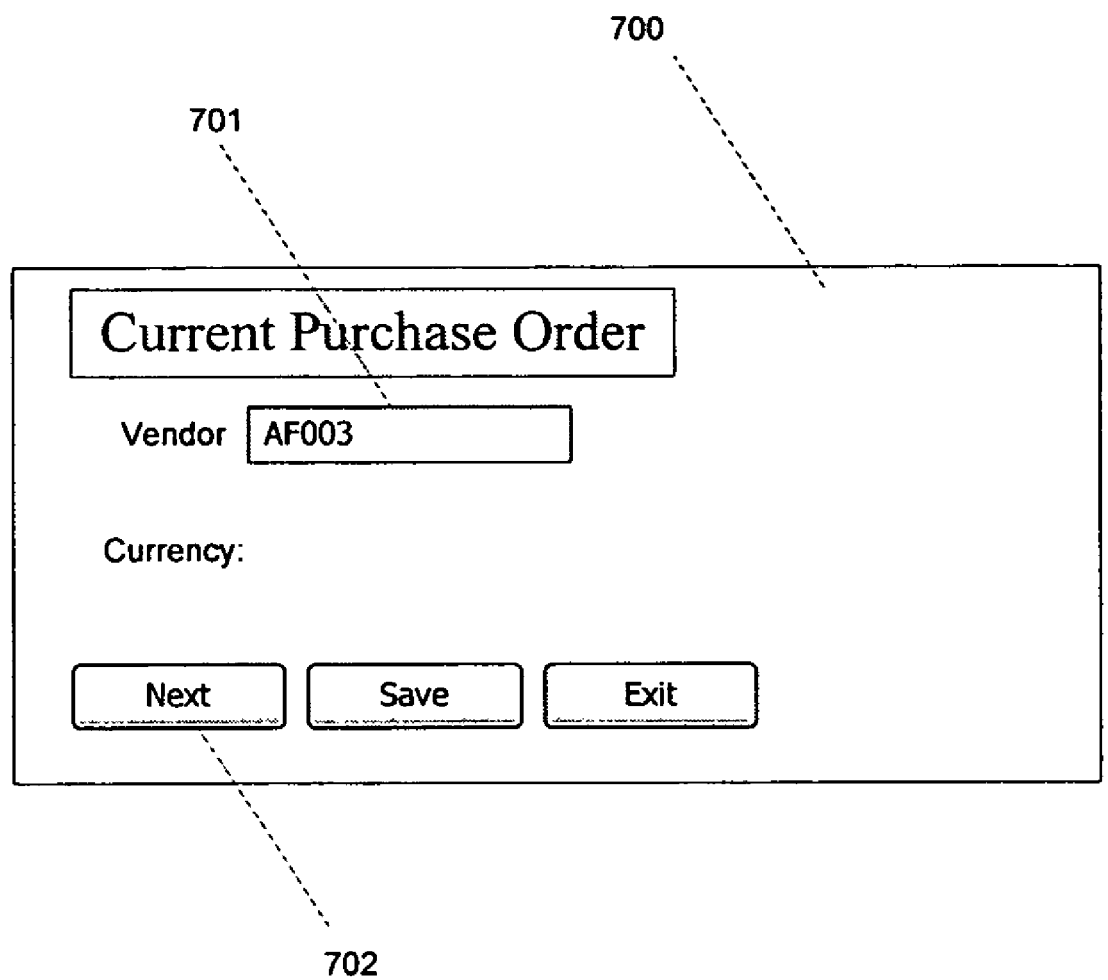
FIG. 7 depicts an example UI of an ERP application.

FIG. 7 depicts an example UI of an ERP application. This screen 700 could be an input screen 500 displayed to a user to input data into an integrated application. The user would be able to input data 701 and then hit "next" 702 to go to the next input screen 501. The processing is done in the dark and the input screens would not provide data to the user.

Figure 8:
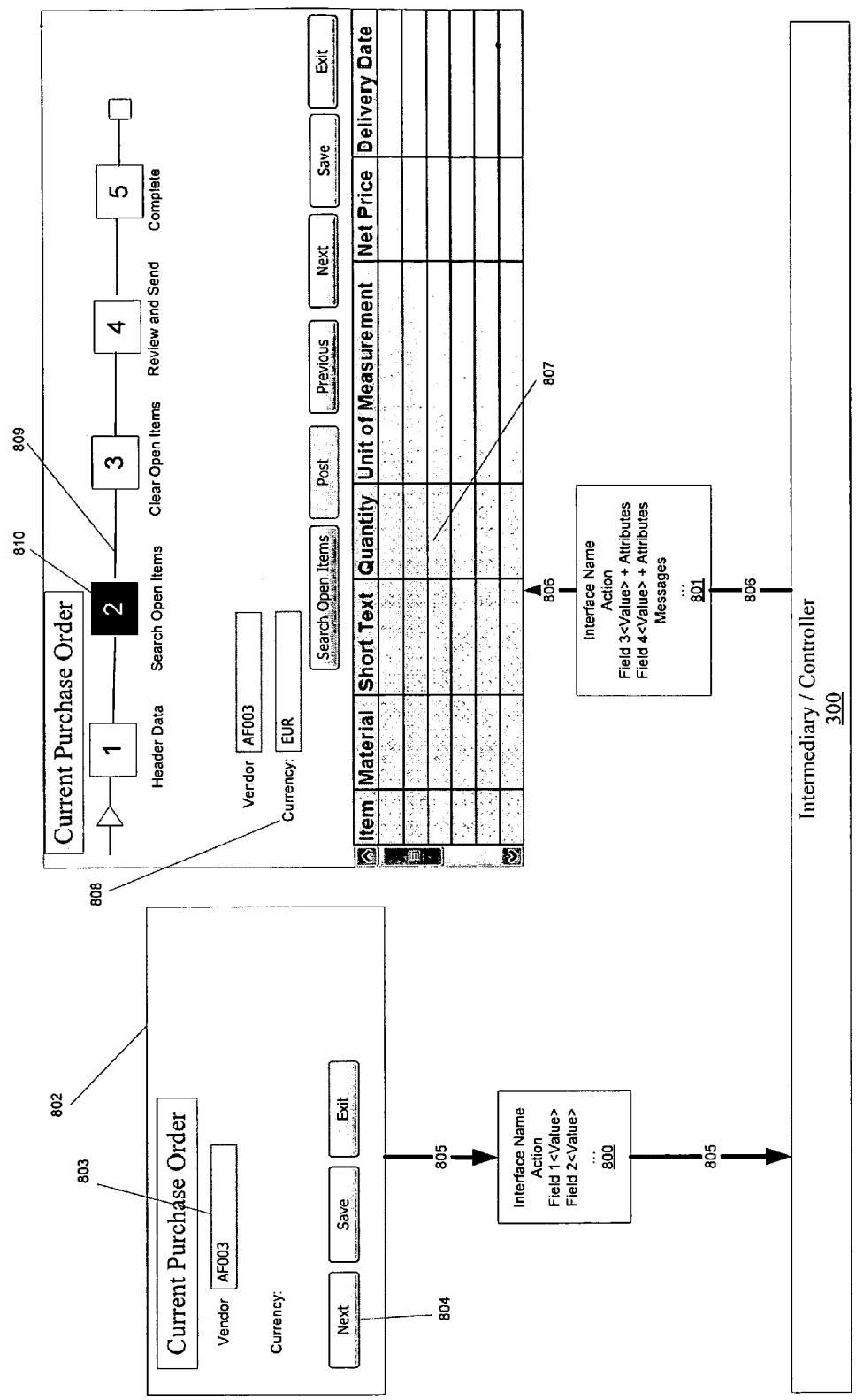
FIG. 8 depicts an example where an intermediary, in this case a controller, communicates with a backend integrated application to return a new user interface.

FIG. 8 depicts an example where an intermediary, in this case a controller 300, communicates with a backend integrated application to return a new user interface. A user may input data 803 into an input screen 802. When the user requests the "next" 804 screen, instead of having all the processing running in the background with the user unaware of the processing occurring, the input screen would send data 805 to the intermediary controller 300. The data 800 may include input 803 from the input screen 802. The controller 300 may take this information and send it to an integrated application for processing with the integrated application's transactional logic. The controller may receive and transmit 806 any pertinent information to develop the new UI. For example, new data may include prior stored data 800 or messages, processed data, and data attributes 801. The interface logic would then use this data to dynamically create a new UI and provide the user with knowledge of the processing that occurred along with new information or related attributes of the data 807 and 808. The interface could also display to the user the process chain 809 as well as the indicate where the user is in the interactive process 810.

Figure 9:
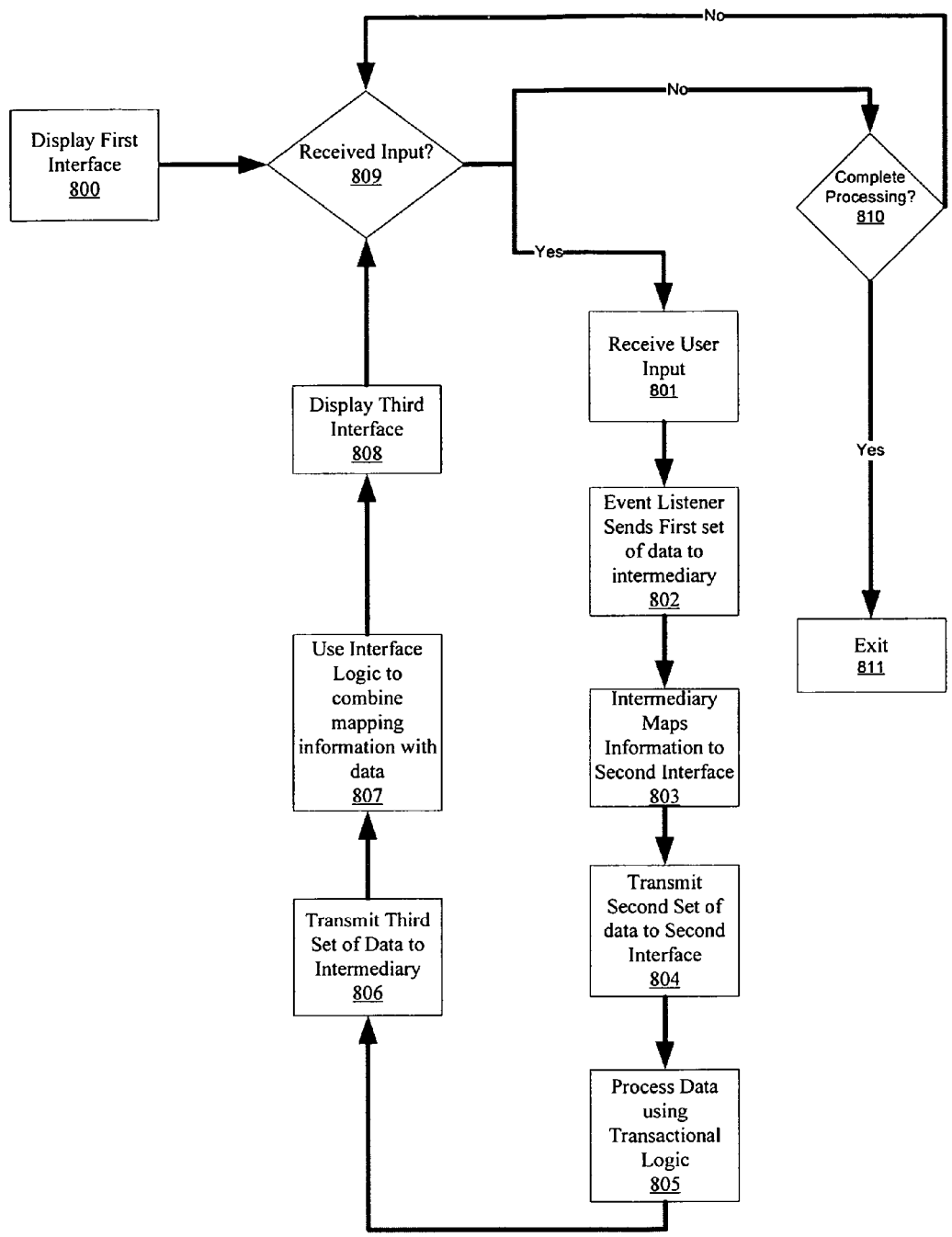
FIG. 9 depicts the example logic that may be performed in order to map and transmit information between a first interface to the second interface of an integrated application in order to create a third interface for interaction with a user.

FIG. 9 depicts the example logic that may be performed in order to map and transmit information between a first interface to the second interface of an integrated application in order to create a third interface for interaction with a user. In an example embodiment logic, a first interface is displayed to a user 800, and this display would be created by interface logic of a new application. The interface would await an input 809, either a mouse click which chooses data, a keyboard input, etc. Once this input is received 801 the event listener sends this first set of data to an intermediary 802, in this example a controller module of a model-view-controller software design paradigm. The intermediary maps the necessary data to a second interface 803. The intermediary then transmits the data to a second interface 804, which is the primary interface of an integrated application. The transactional logic of an integrated application processes the data 805 and updates storage as needed. A third set of data comprising processed data, retrieved data, or the second set of input data is transmitted either through to the interface logic, or in this example logic, to the intermediary 806. The intermediary gathers this information and transmits it through to the interface logic which maps the data onto a new third interface 807. This third interface is displayed 808 and awaits user input 809. This cycle is repeated unless the user inputs to complete processing 810, at which point the user interface exits out of the software application 811.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A computer-implemented method, comprising:
   receiving input data from a first user interface, the input data submitted in accordance with a user-interactive process;
   transmitting the input data to an intermediary;
   at the intermediary, mapping the input data to correspond to inputs accepted by a second user interface of an application;
   transmitting the mapped input data to the second user interface;
   processing, by an application associated with the second user interface, the mapped input data;
   transmitting the processed data from the second user interface to the intermediary; and
   based on the processed data, creating a new third user interface, wherein the new third user interface displays both a process chain illustrating steps of the user-interactive process and a current state of the user-interactive process.

2. The method according to claim 1, wherein the intermediary is a controller module designed under a model-view-controller paradigm.

3. The method according to claim 1, wherein the intermediary stores the first set of data.

4. The method according to claim 1, wherein the intermediary stores mapping information.

5. The method according to claim 1, wherein the second user interface is integrated with a transactional logic.

6. The method according to claim 5, wherein the transactional logic processes the second set of data.

7. The method according to claim 5, wherein the transactional logic is business logic.

8. The method according to claim 1, wherein the intermediary stores the third set of data.

9. The method according to claim 1, further comprising transmitting a fourth set of data from the intermediary to the third interface.

10. The method according to claim 1, wherein the third user interface contains interface logic.

11. The method according to claim 10, wherein the interface logic receives data from the intermediary.

12. The method according to claim 10, wherein the interface logic receives messages from the intermediary.

13. The method according to claim 10, wherein the interface logic receives attribute information from the intermediary.

14. The method according to claim 10, wherein the interface logic receives mapping information from the intermediary.

15. A system comprising:
   a receiver receiving input data from a first user interface, the input data submitted in accordance with a user-interactive process;
   a transmitter transmitting the input data to an intermediary;
   a processor mapping the input data to a second user interface to obtain the mapped input data,
   wherein the transmitter transmits the mapped input data to the second user interface,
   wherein the processor processes the mapped input data to obtain the processed data,
   wherein the transmitter transmits the processed data from the second user interface to the intermediary,
   wherein the processor creates a new third user interface; and
   a terminal providing the new third user interface, the third user interface displaying both a process chain illustrating steps of the user-interactive process and a current state of the user-interactive process.

16. The system according to claim 15, wherein the intermediary is a controller module designed under a model-view-controller paradigm.

17. The system according to claim 15, wherein the intermediary stores the first set of data.

18. The system according to claim 15, wherein the intermediary stores mapping information.

19. The system according to claim 15, wherein the second user interface is integrated with a transactional logic.

20. The system according to claim 19, wherein the transactional logic processes the second set of data.

21. The system according to claim 19, wherein the transactional logic is business logic.

22. The system according to claim 15, wherein the intermediary stores the third set of data.

23. The system according to claim 15, further comprising transmitting a fourth set of data from the intermediary to the third interface.

24. The system according to claim 15, wherein the third user interface contains interface logic.

25. The system according to claim 24, wherein the interface logic receives data from the intermediary.

26. The system according to claim 24, wherein the interface logic receives messages from the intermediary.

27. The system according to claim 24, wherein the interface logic receives attribute information from the intermediary.

28. The system according to claim 24, wherein the interface logic receives mapping information from the intermediary.

29. A computer readable storage medium containing instructions that executed by a processor result in a performance of a method comprising:
receiving input data from a first user interface, the input data submitted in accordance with a user-interactive process;
transmitting the input data to an intermediary;
at the intermediary, mapping the input data to correspond to inputs accepted by a second user interface;
transmitting the mapped input data to the second user interface;
processing, by an application associated with the second user interface, the mapped input data;
transmitting the processed data from the second user interface to the intermediary; and
based on the processed data, creating a new third user interface, wherein the new third user interface displays both a process chain illustrating steps of the user-interactive process and a current state of the user-interactive process.

30. The computer readable storage medium according to claim 29, wherein the intermediary is a controller module designed under a model-view-controller paradigm.

31. The computer readable storage medium according to claim 29, wherein the intermediary stores the first set of data.

32. The computer readable storage medium according to claim 29, wherein the intermediary stores mapping information.

33. The computer readable storage medium according to claim 29, wherein the second user interface is integrated with a transactional logic.

34. The computer readable storage medium according to claim 33, wherein the transactional logic processes the second set of data.

35. The computer readable storage medium according to claim 33, wherein the transactional logic is business logic.

36. The computer readable storage medium according to claim 29, wherein the intermediary stores the third set of data.

37. The computer readable storage medium according to claim 29, further comprising transmitting a fourth set of data from the intermediary to the third interface.

38. The computer readable storage medium according to claim 29, wherein the third user interface contains interface logic.

39. The computer readable storage medium according to claim 38, wherein the interface logic receives data from the intermediary.

40. The computer readable storage medium according to claim 38, wherein the interface logic receives messages from the intermediary.

41. The computer readable storage medium according to claim 38, wherein the interface logic receives attribute information from the intermediary.

42. The computer readable storage medium according to claim 38, wherein the interface logic receives mapping information from the intermediary.

43. A system comprising:
a processor;
means for receiving input data from a first user interface, the input data submitted in accordance with a user-interactive process;
means for transmitting the input data to an intermediary;
means for mapping the input data to correspond to inputs accepted by a second user interface;
means for transmitting the mapped input data to the second user interface;
means for processing the mapped input data;
means for transmitting the processed data from the second user interface to the intermediary; and
means for creating a new third user interface based on the processed data, wherein the new third user interface displays both a process chain illustrating steps of the user-interactive process and a current state of the user-interactive process.

44. The system according to claim 43, wherein the intermediary is a controller module designed under a model-view-controller paradigm.

45. The system according to claim 43, wherein the intermediary stores the first set of data.

46. The system according to claim 43, wherein the intermediary stores mapping information.

47. The system according to claim 43, wherein the second user interface is integrated with a transactional logic.

48. The system according to claim 47, wherein the transactional logic processes the second set of data.

49. The system according to claim 47, wherein the transactional logic is business logic.

50. The system according to claim 43, wherein the intermediary stores the third set of data.

51. The system according to claim 43, further comprising means for transmitting a fourth set of data from the intermediary to the third interface.

52. The system according to claim 43, wherein the third user interface contains interface logic.

53. The system according to claim 52, wherein the interface logic receives data from the intermediary.

54. The system according to claim 52, wherein the interface logic receives messages from the intermediary.

55. The system according to claim 52, wherein the interface logic receives attribute information from the intermediary.

56. The system according to claim 52, wherein the interface logic receives mapping information from the intermediary.

* * * * *